United States Patent [19] Frischmann

[11] 4,197,146

[45] Apr. 8, 1980

[54] MOLDED AMORPHOUS METAL ELECTRICAL MAGNETIC COMPONENTS

[75] Inventor: Peter G. Frischmann, Scotia, N.Y.

[73] Assignee: General Electric Company, Schenectady, N.Y.

[21] Appl. No.: 954,197

[22] Filed: Oct. 24, 1978

[51] Int. Cl.² .................. C04B 35/00

[52] U.S. Cl. .................. 148/31.55; 148/31.57; 148/103; 148/104; 148/108; 148/126; 75/251; 75/252

[58] Field of Search .................. 252/62.55; 148/31.55, 148/31.57, 105, 121, 104, 126, 103, 108; 75/123 B, 123 C, 123 D, 123 J, 123 K, 123 L, 124, 126 R, 126 A, 126 E, 126 G, 126 H, 126 B, 126 K, 126 N, 126 Q, 128 R, 128 B, 128 C, 128 D, 128 P, 128 F, 128 U, 251, 252; 264/6

[56] References Cited

U.S. PATENT DOCUMENTS

| | | | |
|---|---|---|---|
| 3,777,295 | 12/1973 | Laing | 148/104 |
| 3,856,513 | 12/1974 | Chen | 75/123 D |
| 4,006,479 | 2/1977 | La Combe | 252/62.55 |
| 4,063,942 | 12/1977 | Lundgren | 75/251 |
| 4,067,732 | 1/1978 | Ray | 75/128 B |
| 4,069,045 | 1/1978 | Lundgren | 75/251 |
| 4,079,430 | 3/1978 | Fujishima et al. | 75/123 K |

OTHER PUBLICATIONS

Hubbard et al., "Sendust Flake, A New Magnetic Material for Low Frequency Applications," Proc. Conf. on Mag. M & M Boston, 1956, 445–452.

Campbell et al., "A Laminated Flake-Iron Powder for use at Audio and Ultrasonic Frequencies," *Soft Magnetic Materials for Telecommunications,* ed. Richards and Lynch, 1953, pp. 268 to 277.

*Primary Examiner*—L. Dewayne Rutledge
*Assistant Examiner*—John P. Sheehan
*Attorney, Agent, or Firm*—Leo I. MaLossi; James C. Davis, Jr.

[57] ABSTRACT

An article and a method of producing molded electrical magnetic components from amorphous metal segments is provided by compacting the segments.

11 Claims, No Drawings

MOLDED AMORPHOUS METAL ELECTRICAL MAGNETIC COMPONENTS

BACKGROUND OF THE INVENTION

This invention relates to the manufacture of electromagnetic components from amorphous metal discontinuous segments by compressing and molding said segments.

Various electrical components, such as motors and transformers are made up of laminations. By conventional practice, expensive carbide dies are used to punch laminations from steel strip. This process is time consuming and results in up to 50% scrap which is sold back to the steel mill at scrap prices and there are, in addition, handling and transportation costs.

To achieve a lower fabrication and assembly cost of electromagnetic devices, it would be highly desirable to be able to make part of, if not all, of the magnetic path from a moldable material. If acceptable magnetic properties could be achieved in such a moldable material, then the time-consuming and costly assembly operations of interleaving the core and coil of a transformer and the insertion of windings in the slots of motors would be largely eliminated. It is the provision of such a high quality magnetic moldable material to which this invention is directed.

It has been known for some time that the ideal shape of the individual magnetic particles making up this moldable magnetic material should be thin platelets. Such thin platelets when aligned with their longest dimension in the direction of the magnetic flux path will give the composite structure optimum magnetic properties. Platelets or oblate spheroids, as compared to prolate spheroids and to spheres, have the maximum area to transfer flux from one particle to the next yielding the lowest exciting field. With platelets aligned in the direction of flux, eddy current losses in the individual particles will be minimized.

Iron powders in the form of carbonyl iron have been used in composites. When the individual particles are coated with insulating material to reduce eddy current losses of the composite, permeabilities in the 10–20 range are obtained because of the high excitation required to drive the flux through the space between the spheres. Use of this type of material has been limited primarily to radio frequencies because of this low permeability and high cost.

Flakes of iron have been made by rolling powder. Properties of composites made from these flakes are substantially better than composites made from powder but still have relatively high hysteresis losses. These high hysteresis losses are attributed to the random directions of the crystals in the individual flakes, strains in the flakes from pressing as well as boundary impediments to domain wall motion.

Because the crystalline axes are randomly oriented, the anisotropy associated with these axes will be random and yield low permeabilities. Inclusions at the grain boundaries and the high internal stresses inhibit the motion of domain walls. This is a major cause of high losses. Spherical powders suffer from these high hysteresis losses in addition to the high exciting field requirement.

Amorphous magnetic metals, unlike normal crystalline magnetic metals, have no long range atomic order in their structure. Therefore, the directionality of properties such as magnetization normally associated with crystal anisotropy is absent. Also, unlike normal metals, amorphous metals are extremely homogenous, being devoid of inclusions and structural defects. These two characteristics—magnetic isotropy and structural homogeneity—give amorphous metals unusually good dc magnetic properties. The magnetic isotropy leads to extremely low field requirements for saturation, and the structural homogeneity allows the magnetization to reverse with extremely low fields (i.e., a low coercive force). These two features combined with the high resistivity (15 times that of common iron) and lamination thinness provide a material with the lowest ac losses of any known high magnetic saturation material.

Amorphous structures can be obtained by several techniques. Electroplating, vapor deposition, and sputtering are all techniques where the material is deposited on an atom by atom basis. Under specific conditions, the atoms are frozen in place on contact and do not have a chance to move to the lower energy positions of the thermal crystal lattice sites. The resulting structure is an amorphous, noncrystalline glassy one. These methods, however, are not economical for producing large commercial quantities.

The other method for producing amorphous structures in metals is by cooling rapidly from the liquid melt. Two conditions must be met to achieve the amorphous structure by this method. First, the composition must be selected to have a high glass transition temperature, $T_g$, and a low melting temperature, $T_m$. Specifically, the $T_g/T_m$ ratio should be as large as possible. Second, the liquid must be cooled as rapidly as possible from above $T_m$ to below the $T_g$. In practice, it is found that to produce metallic glasses, the cooling rate must be of the order of a million degrees centigrade per second. Even at these high rates, only special compositions can be made amorphous. Typically, "glass forming" atoms such as the metalloids, phosphorous, boron, silicon, and carbon are required additions to the metal alloy, usually in the 10 to 25 atomic percent range.

In machines, such as motors and transformers, there are design requirements on the geometry of the magnetic material. These requirements depend on the properties of the material and the physical structure of the device. Ideally, the material should be continuous along the flux path to form a completely closed magnetic circuit. This would provide the highest permeability possible for the circuit and the lowest excitation current requirements. This geometry is not possible with normal laminated electrical steel because the assembly requirements necessitate cutting the magnetic material. For example, in transformers a complex interleaved joint is fabricated to partially offset the negative effect on the permeability from this cutting. Another special geometric requirement on an ac machine is that the magnetic material be thin in a plane perpendicular to the flux direction. This is essential to minimize the eddy current losses. However, with decreasing lamination thickness more laminations are needed so the punching time and assembly costs increase.

SUMMARY OF THE INVENTION

In accordance with the invention, a liquid metal alloy is fabricated into amorphous segments or flakes for molding into magnetic structures for motors, transformers and other inductive components. A stream of liquid alloy melt is delivered against the relatively rapidly moving cylindrical chill roll or other chilled surface having high thermal conductivity material, such as copper, copper alloys, steel, stainless steel, or the like, said high thermal conductivity material being substantially separated by low conductivity material. The liquid alloy is quenched and solidified and moves away from the chill cylinder to continuously form a ribbon or sheet of solidified metal which is broken or fails to form in the areas of the low conductivity material. By varying the pattern for the low conductivity material a flake of any desired shape can be produced such as substantially oblate spheroid. A method for forming the flake is disclosed and claimed in copending application Ser. No. 954,198 filed the same date as this application in the name of Laforce.

The amorphous metal being processed can be any of the magnetic metals. Typical materials are represented by the formula, $$A_xZ_y,$$

wherein A is one or more of Fe, Co, Ni, Mo, W, Cr and V, Z is one or more of Si, C, B, P, Al, Sn, Sb, Ge, In, and Be, x is an atomic percentage of from 70 to 90, and y is an atomic percentage of from 30 to 10. Typical materials are disclosed in U.S. Pat. No. 3,856,513 to Chen et al. which is herein incorporated by reference.

The metal flakes for soft magnetic properties should be at least 50% amorphous and preferably 90% or more. In order to maximize the magnetic properties, the percent by volume of magnetic material in the composite should be between about 50% and about 95%, and preferably between about 85% and about 95%. The length of the flakes is generally between about 0.01" and about 1", and preferably between about 0.1" and about 0.5", and the width of the flakes is generally between about 0.01" and about 1", preferably between about 0.02" and about 0.5". The aspect ratio or ratio of length to width can be between about 1:1 and about 100:1, depending upon the method of fabrication, with a segment thickness of between about 0.0005" and about 0.002", and preferably between about 0.0008" and about 0.0015". The aspect ratio or ratio of length to width is adjusted according to the method of compacting and aligning. For extrusion lower aspect ratios, e.g., 1:1, are used at the sacrifice of some exciting fields. For die pressing a higher aspect ratio, e.g., 5:1 or more, is acceptable and yields better magnetic properties. For best results, the segments are substantially oblate spheroidal and substantially all amorphous, 50% or more and preferably 75% to 100%.

To obtain the best magnetic properties in the component or composite, the flakes must be aligned with their long axes parallel to the lines of force, in contact with one another along the axis and lying in the same plane. The flakes can be combined with or without a binder, but preferably a binder is employed in some applications as it may improve the ac electrical properties.

When a binder is employed, the amorphous flakes and binder can be completely interdispersed to form a uniform composite or the flakes can be held in place by an external shell of binder. The binder may penetrate the outer layers of the flake by the second method for adherence and expansion control. The flakes can be aligned by means of a magnetic field, either ac or dc, or both, by vibration or coextrusion of binder and flake. The flake can be extruded through a nozzle to form a flexible tape which then can be spirally wound into a form, such as to form the yoke of a motor. By this method, the alignment of the flake and forming of the final part is accomplished simultaneously. Nozzle aspect ratios and shapes, extrusion pressures, type and volume fraction of binder for best magnetic properties will depend upon the materials, and uses and the like, but can be determined without undue experimentation.

Another method of composite forming is the direct die pressing of flake and binder or flake alone in the form of a flat toroid. In this method the use of an ac or a dc field combined with vibration prior to pressing aids in alignment of the flake. If a binder is employed, generally from about 1% to about 50% percent by volume of initial constituents is sufficient and preferably from between about 2% and about 10%. The pressing force will depend upon the materials and uses and the like, but generally is between about 5,000 psi and about 30,000 psi.

For good results, the flake will be annealed either before, during or after compacting, but for best results during compacting. When a binder is employed it must be able to withstand the annealing conditions. Depending upon the processing and annealing conditions and the desired end use, organic binders can be employed, such as the epoxys, polyamideimides, polyamides, cyanoacrylates, and phenolics. The binder should have a coefficient of thermal expansion compatible with the metal flake, be electrically insulating, cure rapidly and be able to meet the thermal requirements of the intended application and annealing if required. In some applications there are further requirements, such as being compatible with commercial refrigerants when used for air-conditioning compressor motors. The binder may be applied by spraying, dipping and other conventional processes.

The following examples will serve to illustrate the invention and preferred embodients thereof. All parts and percentages in said examples are by weight unless otherwise specified.

EXAMPLES

In accordance with the general procedure of the above noted copending application Ser. No. 954,198 substantially oblate spheroid segments of $\frac{1}{4}'' \times 1/16'' \times 0.001''FE_{82}B_{15}Si_3$ are produced in which 95% of the segments are substantially amorphous and 5% crystalline. Employing a chill roll formed of copper to which india ink is applied with a draftsman pen to define the desired shape and size of the particles, the roll is driven at a surface speed in the order of 4,000 to 6,000 feet per minute and liquid alloy melt delivered to the patterned circumferenetial surface of the chill roll. The molten alloy as it impinges on the circumferential surface of the roll looses its heat to the large rotating mass and changes to a solid almost immediately. As the alloy melt comes in contact with the high thermal conductivity copper pattern, it remains amorphous on freezing and that which makes contact with the ink cools more slowly and causes the metal to separate in the desired form and shape.

The resultant flake (6.7 grams) is pressed in a torroidal die cavity at a pressure of 100 ksi. The composite is then tested in a dc hystersigraph and found to have a coercive force of 0.6 Oe after annealing at 325° C. for two hours indicating low hysteresis losses despite the 5% crystalline material contained therein and useful as a motor or transformer material. In comparision, a prior art composite or crystalline normal iron flake has a coercive force of 2 Oe.

A stator is formed by comixing 8 grams of the aforesaid flake and 1 gram of Barkobond epoxy and the mixture pressed in a die cavity at a pressure of 2,000 psi until the epoxy cured. When tested in a dc hystersigraph, the composite is found to have a coercive force less than 0.6 O.

Other cores useful as transformers and stators are prepared employing various amorphous metals and binders with the best magnetic properties achieved for composites formed of substantially all amorphous metals.

While the invention has been particularly shown and described with reference to several embodiments of the invention, it will be understood by those skilled in the art that other changes in form and detail can be made therein without departing from the spirit and scope of the invention.

What I claim is:

1. An electrical magnetic component comprising a magnetic metal which is at least 50% amorphous characterized by compacted discontinuous substantially oblate spheroidal flakes having a thickness between about 0.0005" and about 0.002", a length between about 0.01" and about 1", and a width between about 0.01" and about 1", wherein the metal has the composition represented by the formula, $$A_xX_y,$$

with A being one or more of Fe, Co, Ni, Mo, W, Cr, and V; Z being one or more of Si, C, B, P, Al, Sn, Sb, Ge, In, and Be; x being an atomic percentage of from 70–90, and y being an atomic percentage of from 30–10, said flakes being aligned in the direction of magnetic flux to reduce eddy current losses.

2. The component of claim 1, wherein the percent by volume of magnetic material of the component is from about 50% to about 95%.

3. The component of claim 1, wherein the flakes are at least 90% amorphous.

4. The component of claim 1, wherein the flakes are annealed.

5. The component of claim 1, wherein a binder is therein.

6. The component of claim 1, wherein the component is in the shape of a toroidal core.

7. The component of claim 1, wherein the component is a stator.

8. The component of claim 1, wherein A is Fe.

9. The component of claim 1, wherein A is Fe and Z is B and Si.

10. The component of claim 1, wherein the aspect ratio of the flakes is between about 1:1 and 100:1.

11. The component of claim 1, wherein the flakes have a thickness between about 0.0008" and about 0.0015", a length between about 0.1" and about 0.5" and a width between about 0.02" and about 0.5".

* * * * *